United States Patent [19]

Palmer

[11] 4,251,416

[45] Feb. 17, 1981

[54] CARPET BACKING ADHESIVE

[75] Inventor: Jay W. Palmer, Temple Terrace, Fla.

[73] Assignee: United States Gypsum Company, Chicago, Ill.

[21] Appl. No.: 96,581

[22] Filed: Nov. 21, 1979

[51] Int. Cl.³ .............................................. C08K 3/24
[52] U.S. Cl. ................................ 260/29.7 S; 428/95; 428/97; 528/487
[58] Field of Search .................. 260/29.7 S, 29.7 SQ; 528/487; 428/97

[56] References Cited

U.S. PATENT DOCUMENTS

| | | | |
|---|---|---|---|
| 2,734,883 | 2/1956 | Bowell | 260/29.7 SQ |
| 3,951,900 | 4/1976 | Bath | 260/29.7 S |

*Primary Examiner*—Paul R. Michl
*Attorney, Agent, or Firm*—Robert M. Didrick; Robert H. Robinson; Kenneth E. Roberts

[57] ABSTRACT

The coagulation of a styrene butadiene latex emulsion which normally occurs upon the introduction of gypsum as a filler in the preparation of an adhesive composition is prevented by the addition of ammonium sulfate or sodium sulfate or a mixture of the two to the emulsion prior to the addition of the gypsum.

15 Claims, No Drawings

CARPET BACKING ADHESIVE

This invention relates to an adhesive composition particularly adapted for anchoring carpet pile yarn fibers to the backing fabric.

Styrene-butadiene (SBR) latex emulsions, particularly those in which the resin is carboxylated, have been used as carpet backing adhesives for many years. Cheap fillers such as whiting are commonly used and the use of aluminum oxide trihydrate as a fire retardant filler has been promoted.

In its teaching of the use of gypsum (calcium sulfate dihydrate) as a substitute for aluminum oxide trihydrate, U.S. Pat. No. 3,951,900 states that prior attempts to use gypsum as a filler were unsuccessful because its addition resulted in the coagulation of the latex emulsion. The patentee teaches that the problem may be overcome by the prior addition of a non-ionic surface active agent to the emulsion.

D. C. Blackley teaches at pages 681–682 of "High Polymer Latices" (Applied Science Publishers, Ltd., London, 1966) that SBR latex emulsions may be stabilized against the effects of calcium salts by the addition of a sulfonate type surface active agent and that certain emulsions should contain a deflocculant such as potassium pyrophosphate.

Surface active agents, however, have an adverse effect upon the adhesive bond strength and may also cause undue foaming of the emulsion during formulation and application. Potassium pyrophosphate is a sequestering agent.

It remained, however, for the present inventor to discover that the coagulation of an SBR latex emulsion by gypsum may be prevented by the prior addition to the emulsion of a commonly available, cheap and readily handled chemical.

It is an object of this invention, therefore, to provide a new composition of matter which is valuable as an adhesive for carpet making.

It is a further object of this invention to provide a coagulation-resistant carpet backing adhesive containing a styrene-butadiene latex emulsion and a calcium ion-releasing filler and a commonly available, cheap and readily handled inorganic sulfate as an anti-coagulant.

It is another object of this invention to provide a method for preventing the coagulation of an SBR latex emulsion upon admixture with gypsum by the prior addition thereto of a non-sequestrant.

It is yet another object of this invention to provide a method for anchoring pile yarns into the backing fabric during the manufacture of a carpet.

It is a still further object of this invention to provide a carpet having a gypsum-filled backing.

These and other objects are achieved by the discovery that the coagulation of an SBR latex emulsion upon the addition of gypsum to said emulsion is prevented by the prior addition to said emulsion of at least one anti-coagulant selected from the class consisting of ammonium sulfate and sodium sulfate.

The SBR latex emulsion may be prepared in accordance with known procedures such as, for example, the polymerization of the respective monomers in appropriate proportions in an aqueous medium containing an emulsifying agent and a peroxide catalyst. An emulsion stabilizer, such as an anionic surface-active agent, is usually added during the polymerization process. The SBR latex is usually a binary copolymer of styrene and butadiene but copolymers incorporating a third or fourth monomer may also be utilized in this invention. A preferred latex in the carpet adhesive industry is a carboxylated styrene-butadiene polymer having a fairly high styrene content.

The emulsion usually contains about 50% water, by weight, but may contain more or less, e.g. from about 40% to about 60%. Extra water may be added in order to attain the desired working properties of the adhesive composition.

An agricultural grade gypsum such as landplaster may be used in this invention. The gypsum used in the examples hereinbelow had been ground to a fineness such that approximately 50% of it passes through a U.S. Standard 325 mesh screen and about 94% passes through a 100 mesh screen. More refined grades such as terra alba may be used but usually to no great advantage.

The amount of gypsum used is generally from about 50% to about 70% by weight of the total adhesive composition although it may be from about 10% to about 80%. Preferred compositions contain from about 55% to about 65% by weight of gypsum.

The amount of anti-coagulant is usually from about 0.5% to about 5% by weight of the total adhesive composition or from about 0.5% to about 30%, preferably from about 1% to about 20%, of the latex emulsion. A preferred adhesive composition contains from about 1% to about 3.5% of the anti-coagulant.

When sodium sulfate is selected as the anti-coagulant, it may be used in the anhydrous form, in the form of Glauber's salt (i.e. the decahydrate) or in any other active form. Water of hydration must be discounted, of course, when calculating the amount of sodium sulfate to be used. Ammonium sulfate is preferred as the anti-coagulant.

The temperatures at which the anti-coagulant is mixed with the SBR latex emulsion and at which the gypsum is added to the mixture of the emulsion and anti-coagulant are not critical so long as they are within the range usually encountered in the manufacture of the type of adhesive contemplated by this invention. The temperature may range from just above the freezing point of the emulsion to just below the thermal degradation temperature, i.e., the temperature at which the emulsion disintegrates because of too much heat. Usually, the additions are made at the ambient temperature of the system, that is, without supplementary heating or cooling.

Other additives commonly used in carpet backing adhesives such as thickeners, anti-oxidants, anti-freeze compositions, fungicides, corrosion inhibitors and colorants may be present in the carpet backing adhesives of this invention. A sodium polyacrylate is representative of one type of thickener that may be used. Each additive must be selected carefully so that it is compatible with the prime ingredients of the composition and does not adversely affect the function of the other additives.

The carpet backing adhesive of this invention may be applied to the carpet by the techniques usually employed in the industry. A lick-roll technique, a spreading technique and a spraying technique are described in the "High Polymer Latices" book referred to hereinabove. Briefly, the lickroll application comprises pulling the carpet under tension through an assembly of rollers, brushing and steaming the carpet back, pressing the back with a lick-roller carrying the adhesive from a bath of adhesive in which the lick-roller revolves, passing the adhesive-coated carpet back under a doctor blade to control the thickness of the adhesive and drying the adhesive with heat to cure the adhesive.

Compositions of this invention, methods for their preparation and properties of the compositions are illustrated by the following examples. Parts and percentages are expressed in terms of weight unless otherwise specified.

EXAMPLE 1

To a mixture of 1.8 parts of a sodium polyacrylate thickener (sampled as Polyresin 9520 but sold as Polyresin 5546 by Bate Chemical Co. Ltd., Don Mills, Ontario, Canada) and 104 parts of an anionically stabilized emulsion of a carboxylated styrene-butadiene latex having a solids content of about 50% (Dow 892), there is added a solution of 4 parts of ammonium sulfate in 32 parts of water. After the resulting mixture is thoroughly blended, 200 parts of gypsum (U.S. Gypsum Company's landplaster from Sperry, Iowa) are stirred in at the ambient temperature. A slurry having a uniform consistency was obtained within a few minutes. The initial Brookfield viscosity of the slurry is 23,500 cps. After two weeks of storage the Brookfield viscosity is 19,000 cps.

EXAMPLE 2

The general procedure of Example 1 is followed except that 12 parts of ammonium sulfate are used. The initial Brookfield viscosity is 8,400 cps and after two weeks of storage the viscosity is 9,500 cps.

EXAMPLE 3

The general procedure of example 1 is followed except that 1 part of the acrylic thickener is used. The initial Brookfield viscosity is 12,000 cps and after two weeks of storage the viscosity is 13,000 cps.

EXAMPLE 4

A mixture of 50 parts of the raw latex emulsion used in Example 1 and 5 parts of anhydrous sodium sulfate is stirred at the ambient temperature until the added solid dissolves. Stirring is continued while 100 parts of the Sperry land-plaster are added. The slurry was quite fluid after 0.5 hour and had retained its fluidity after 3½ weeks of storage.

EXAMPLE 5

The general procedure of Example 4 is followed except that the sodium sulfate is replaced by 2 parts of ammonium sulfate. A slurry is obtained which is very fluid initially and after two weeks of storage.

In contrast to the results reported in the above Examples, a mixture of 110 parts of the same latex emulsion and 200 parts of the same gypsum solidified within 70 minutes after the two ingredients were mixed together. The use of the acrylic thickener did not prevent coagulation as is shown by the solidification within half an hour of a mixture of 26 parts of the latex emulsion, 0.45 part of the thickener, 8 parts of water and 50 parts of the gypsum.

A surprising facet of the work which led to the discovery of the phenomenon embodied in this invention is the lack of an anti-coagulant action by potassium sulfate when it is added to the latex emulsion prior to the addition of gypsum.

Thus, the invention has been described in the above Examples with particular reference to specific embodiments and the best mode of performing the method of the invention known to the inventor at this time has been disclosed. It will be appreciated, however, that the invention is not restricted by said embodiments or by said mode.

What is claimed is:

1. An adhesive composition comprising an aqueous styrene-butadiene latex emulsion, calcium sulfate dihydrate and from about 0.5% to about 5% by weight of at least one anti-coagulant selected from the class consisting of ammonium sulfate and sodium sulfate.

2. The composition of claim 1 wherein the calcium sulfate dihydrate is present in an amount ranging from about 50% to about 70% by weight.

3. The composition of claim 1 wherein the anti-coagulant is ammonium sulfate.

4. The composition of claim 1 wherein the emulsion is anionically stabilized.

5. The composition of claim 1 further comprising sodium polyacrylate as a thickener.

6. A method for imparting coagulation resistance to an aqueous styrene-butadiene latex emulsion to which gypsum is to be added, said method comprising mixing at least one anti-coagulant selected from the class consisting of ammonium sulfate and sodium sulfate with said emulsion prior to the addition of the gypsum.

7. The method of claim 6 wherein the anti-coagulant is added in an amount ranging from about 0.5% to about 30% by weight of the latex emulsion.

8. The method of claim 6 or claim 7 wherein the anti-coagulant is ammonium sulfate.

9. The method of claim 7 wherein the amount ranges from about 1% to about 20%.

10. The method of claim 8 wherein the emulsion is an anionically stabilized.

11. A method of preparing a carpet backing adhesive comprising mixing an aqueous emulsion of a styrene-butadiene latex with, firstly, from about 0.5% to about 5%, based on the total weight of the adhesive, at least one anti-coagulant selected from the class consisting of ammonium sulfate and sodium sulfate, and secondly gypsum at ambient temperature.

12. The method of claim 11 wherein the anti-coagulant is ammonium sulfate.

13. The method of claim 11 wherein the percentage by weight of anti-coagulant is from about 1% to about 3.5% of the total weight.

14. A carpet comprising pile yarns anchored into a backing fabric by an adhesive mixture of an aqueous emulsion of a styrene-butadiene latex, gypsum and from about 0.5% to about 5% by weight of at least one anti-coagulant selected from the class consisting of ammonium sulfate and sodium sulfate.

15. The carpet of claim 14 wherein the anti-coagulant for the adhesive is ammonium sulfate.

* * * * *